(12) United States Patent
Morgan et al.

(10) Patent No.: US 8,532,908 B2
(45) Date of Patent: Sep. 10, 2013

(54) SYSTEM AND METHOD FOR ESTIMATING INDICATED MEAN EFFECTIVE PRESSURE OF CYLINDERS IN AN ENGINE

(75) Inventors: Jeffrey A. Morgan, Macomb, MI (US); David S. Mathews, Howell, MI (US); Ronald J. Herrin, Troy, MI (US); John V. Bowman, Farmington, MI (US); Julian R. Verdejo, Farmington, MI (US)

(73) Assignee: GM Global Technology Operations LLC

( * ) Notice: Subject to any disclaimer, the term of this patent is extended or adjusted under 35 U.S.C. 154(b) by 297 days.

(21) Appl. No.: 13/118,985

(22) Filed: May 31, 2011

(65) Prior Publication Data
US 2012/0310505 A1  Dec. 6, 2012

(51) Int. Cl.
*G06F 19/00* (2011.01)
*G06F 15/00* (2006.01)
(52) U.S. Cl.
USPC .......................................... 701/102; 123/435

(58) Field of Classification Search
USPC ............... 701/102, 110, 111, 114; 123/48 R, 123/435; 73/114.16, 114.47
See application file for complete search history.

(56) References Cited

U.S. PATENT DOCUMENTS

| | | | | |
|---|---|---|---|---|
| 4,760,825 A | * | 8/1988 | Morita | 123/350 |
| 5,107,813 A | * | 4/1992 | Inoue et al. | 123/406.22 |
| 5,229,945 A | * | 7/1993 | Demizu et al. | 701/102 |
| 2004/0236496 A1* | | 11/2004 | Sobel | 701/114 |
| 2009/0276143 A1* | | 11/2009 | Rackmil et al. | 701/103 |

OTHER PUBLICATIONS

U.S. Appl. No. 12/984,818, filed Jan. 5, 2011, Verdejo et al.

* cited by examiner

*Primary Examiner* — Mahmoud Gimie

(57) ABSTRACT

A system for an engine includes first, second, third, and fourth modules. The first module determines an expected response of crankshaft speed due to combustion within a cylinder of the engine. The second module determines a value based on the expected response and a measured response of crankshaft speed due to combustion within the cylinder of the engine. The third module estimates an indicated mean effective pressure (IMEP) for the cylinder of the engine based on the value. The fourth module selectively adjusts an operating parameter of the engine based in the estimated IMEP.

20 Claims, 6 Drawing Sheets

SYSTEM AND METHOD FOR ESTIMATING INDICATED MEAN EFFECTIVE PRESSURE OF CYLINDERS IN AN ENGINE

FIELD

The present disclosure relates to internal combustion engines and more particularly to a system and method for estimating indicated mean effective pressure (IMEP) of cylinders in an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft and generate drive torque. Indicated mean effective pressure (IMEP) of a cylinder represents a theoretical constant pressure within the cylinder during a combustion cycle which produces the same amount of power as the actual (non-constant) cylinder pressure. The IMEP of a cylinder may be determined based on measurements from a pressure sensor within the cylinder. IMEP may be used to determine whether a misfire occurred within the cylinder. In addition, IMEP may be used to control fuel and/or ignition timing during a future combustion cycle of the cylinder.

SUMMARY

A system for an engine includes first, second, third, and fourth modules. The first module determines an expected response of crankshaft speed due to combustion within a cylinder of the engine. The second module determines a value based on the expected response and a measured response of crankshaft speed due to combustion within the cylinder of the engine. The third module estimates an indicated mean effective pressure (IMEP) for the cylinder of the engine based on the value. The fourth module selectively adjusts an operating parameter of the engine based in the estimated IMEP.

A method for an engine includes determining an expected response of crankshaft speed due to combustion within a cylinder of the engine, determining a value based on the expected response and a measured response of crankshaft speed due to combustion within the cylinder of the engine, estimating an indicated mean effective pressure (IMEP) for the cylinder of the engine based on the value, and selectively adjusting an operating parameter of the engine based in the estimated IMEP.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
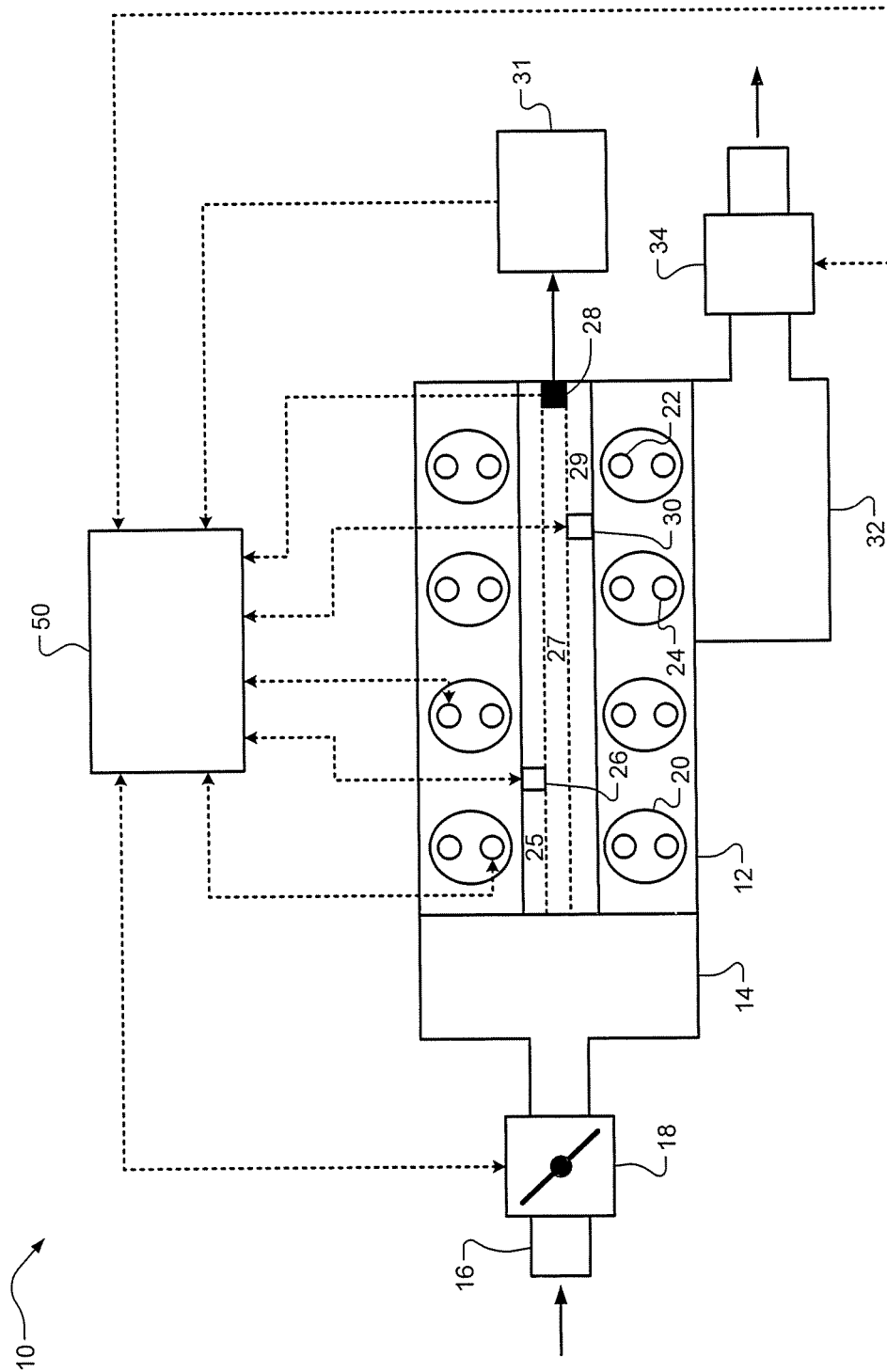
FIG. 1 is a functional block diagram of an example engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Indicated mean effective pressure (IMEP) of a cylinder may be used to determine whether the cylinder misfired. In addition, IMEP may be used for improved combustion control. Specifically, IMEP may indicate a torque imbalance across cylinders of an engine. Therefore, the torque generated by each cylinder of the engine may be balanced by adjusting combustion parameters such as spark advance. However, implementing a pressure sensor for each of the cylinders increases cost. Alternatively, inaccurate IMEP determination (or a lack of IMEP determination) may result in undetected misfires and unbalanced combustion which may damage the engine and/or decrease performance/fuel economy.

Accordingly, a system and method are presented for estimating IMEP in an engine. The system and method may decrease cost by estimating IMEP without implementing pressure sensors for each of the cylinders in the engine. The system and method may first determine expected responses in crankshaft speed fluctuations due to combustion in each of N cylinders of the engine ($N \geq 1$). The expected responses may be M vectors ($M > N$) including expected responses for differential pressure combustion within each of the N cylinders and a misfiring of all of the N cylinders. Thus, M may equal N+1. The M expected response vectors may be either modeled or generated based on data collected during testing. The M expected response vectors, therefore, may be predetermined and stored in memory. The M expected response vectors may also be represented as a P×M matrix, where P may be a number of sampling points of crankshaft speed for one engine cycle ($P \geq M$).

The system and method may then determine values for each of the N cylinders based on the M expected response vectors and a measured response in crankshaft speed due to combustion within each of the N cylinders. The measured response in crankshaft speed may also be a vector. Specifically, the system and method may determine the values for each of the N cylinders based on a product of an inverse P×M matrix and the measured response vector. The inverse P×M matrix may be generated based on a product of an inverse and a transpose of the P×M matrix, the inverse including an inverse of a product of the transpose of the P×M matrix and the P×M matrix. The product of the inverse P×M matrix and the measured response vector, therefore, may also be a vector. The values in this vector may also be referred to as coefficients. The vector may include values/coefficients for each of the M expected response vectors.

The N calculated values for the N differential pressure combustion response vectors, respectively, are related to IMEP. Therefore, the system and method may then estimate IMEP for each of the N cylinders based on the N calculated values. For example, the system and method may use a lookup table to determine the IMEP of a cylinder based on a corresponding value. After estimating the IMEP for each of the N cylinders, the system and method may then detect misfires and/or control combustion. The system and method may detect a misfire of a cylinder when the estimated IMEP is less than a predetermined threshold. For example, a warning signal may be generated or a misfire flag may be set. The system and method may also control combustion based on the estimated IMEP for each of the N cylinders. Specifically, the system and method may selectively advance or retard spark timing for each of the N cylinders based on the estimated IMEPs to balance torque generated by each of the N cylinders.

Additionally, in other examples of the present disclosure, the system and method may be implemented with other engine types and diagnostic applications. For example, the system and method may be implemented in variable displacement engines (i.e., cylinder deactivation/reactivation) and/or used to determine whether pre-ignition occurred within the cylinder. Specifically, in these other engine types and diagnostic applications, the system and method may be implemented by including additional and/or different expected response vectors (calculated or measured using additional or different cylinder pressure loading conditions) according to a suitable approach.

Referring now to FIG. 1, an engine system 10 includes an engine 12. The engine 12 may be a spark ignition (SI) engine, a diesel engine, a homogeneous charge compression ignition (HCCI) engine, or another suitable type of engine. In a hybrid engine system, the engine system 10 may also include additional components such as an electric motor and a battery system. The engine 12 draws air into an intake manifold 14 through an induction system 16 that may be regulated by a throttle 18. For example, the throttle 18 may be electrically controlled using electronic throttle control (ETC).

The air in the intake manifold 14 is distributed to a plurality of cylinders 20 and combined with fuel from a plurality of fuel injectors 22, respectively, to create an air/fuel (A/F) mixture. While 8 cylinders are shown (N=8), the engine 12 may include other numbers of cylinders. The air is drawn into the cylinders 22 through intake valves (not shown). An intake camshaft 25 opens and closes the intake valves (not shown). An intake camshaft phaser 26 controls a phase of the intake camshaft 25 thereby controlling timing of the intake valves (not shown).

The A/F mixture is compressed by pistons (not shown) within the cylinders 20 and combusted to drive the pistons (not shown) which rotatably turn a crankshaft 27 and generate drive torque. Depending on the type of engine 12, a plurality of spark plugs 24 may generate spark within each of the cylinders 20 to combust the compressed A/F mixture. An engine speed sensor 28 measures a rotational speed of the crankshaft 27. For example, the engine speed sensor 28 may measure the rotational speed of the crankshaft 27 in revolutions per minute (RPM) or in time periods (e.g., seconds) between specific angular positions of the crankshaft 27. The drive torque may be transferred from the crankshaft 27 to a driveline 31 of a vehicle via a transmission (not shown) and in some implementations a torque converter (not shown).

Exhaust gas resulting from combustion may be expelled from the cylinders 20 through exhaust valves (not shown) and into an exhaust manifold 32. An exhaust camshaft 29 opens and closes the exhaust valves (not shown). An exhaust camshaft phaser 30 controls a phase of the exhaust camshaft 29 thereby controlling timing of the exhaust valves (not shown). The exhaust gas in the exhaust manifold 32 may be treated by an exhaust treatment system 34 before being released into the atmosphere. For example, the exhaust treatment system 34 may include at least one of an oxidation catalyst (OC), nitrogen oxide (NOx) adsorbers/absorbers, a selective catalytic reduction (SCR) system, a particulate matter (PM) filter, and a three-way catalytic converter.

A control module 50 controls operation of the engine system 10. The control module 50 may receive signals from the throttle 18, the fuel injectors 22, the spark plugs 24, the intake camshaft phaser 26, the engine speed sensor 28, the exhaust camshaft phaser 30, and/or the exhaust treatment system 34. The control module 50 may also receive signals from other sensors (not shown) indicating other operating parameters such as mass air flow (MAF) rate, manifold absolute pressure (MAP), intake air temperature (IAT), etc. The control module 50 may control the throttle 18, the fuel injectors 22, the spark plugs 24, the intake camshaft phaser 26, the exhaust camshaft phaser 30, and/or the exhaust treatment system 34. The control module 50 may also implement the system or method of the present disclosure.

Figure 2:
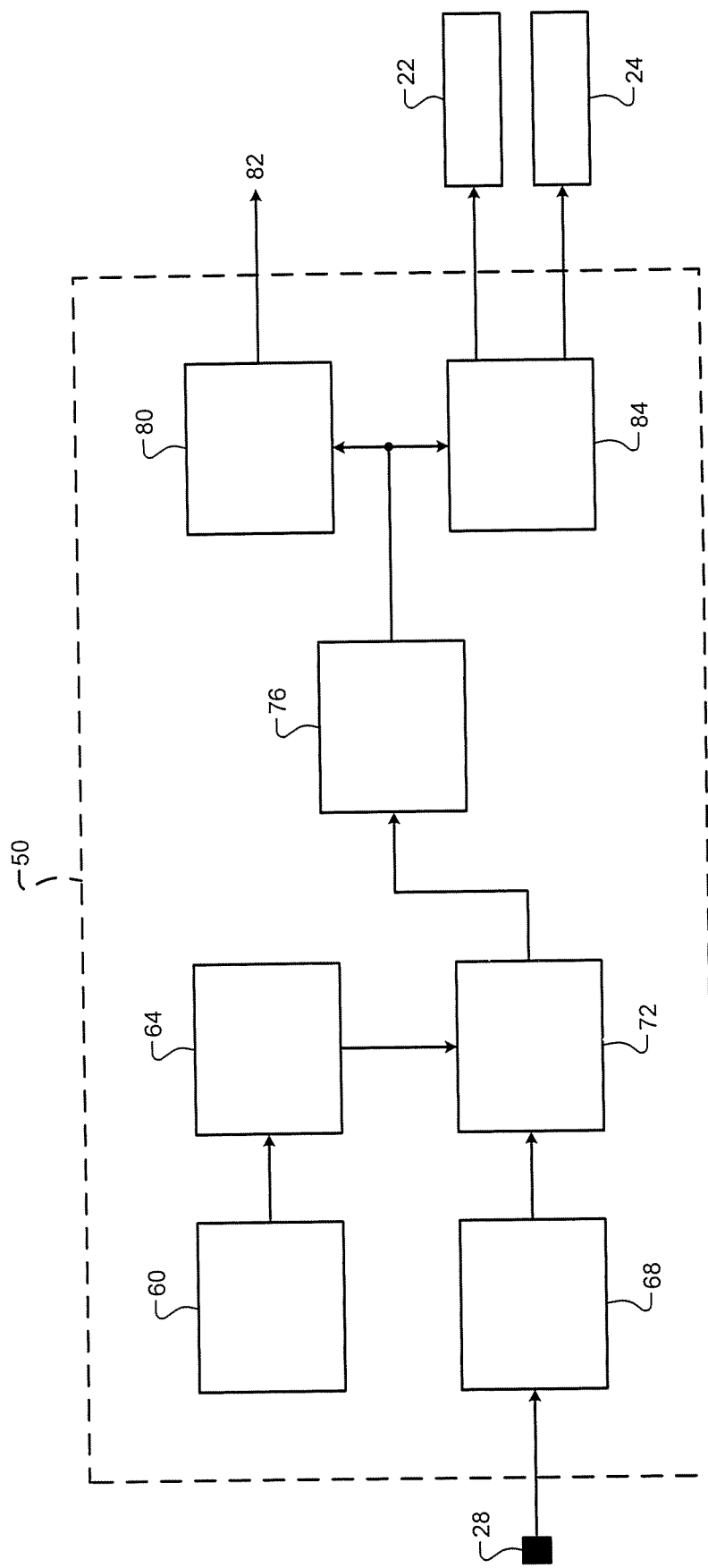
FIG. 2 is a functional block diagram of an example control module according to one implementation of the present disclosure.

Referring now to FIG. 2, an example of the control module 50 is shown. The control module 50 may include an expected response module 60, an inverse determination module 64, a measured response module 68, a coefficient calculation module 72, an IMEP estimation module 76, a misfire detection module 80, and a combustion control module 84. The expected response module 60 may also be referred to as a first module. The coefficient calculation module 72 may also be referred to as a second module. The IMEP estimation module 76 may also be referred to as a third module. The misfire detection module 80 and/or the combustion control module 84 may also be referred to as a fourth module. The measured response module 68 may also be referred to as a fifth module. The inverse determination module 64 may also be referred to as a sixth module.

The expected response module 60 determines the expected response of the crankshaft speed fluctuations due to combustion. Specifically, the expected response module 60 may generate M vectors including expected response due differential pressure firing for each of the N cylinders and a misfiring of all of the N cylinders. The M generated vectors may also be represented as a P×M matrix. The expected response (the P×M matrix) may be generated based on a model or based on data collected during testing. Furthermore, the expected response P×M matrix may be determined at different engine mean speeds and mean torque loadings to allow different matrices to be used for different engine operating conditions. In addition, any combination of model or test data based vectors may be used in the P×M matrices. The generated P×M matrices may be predetermined and stored in memory. For example, the model-based P×M matrix of expected responses may be generated by applying M pressure loading conditions to each cylinder as follows (shown for N=8 and M=9):

$$T = \begin{matrix} MF & DF & 0 & 0 & 0 & 0 & 0 & 0 & 0 \\ MF & 0 & DF & 0 & 0 & 0 & 0 & 0 & 0 \\ MF & 0 & 0 & DF & 0 & 0 & 0 & 0 & 0 \\ MF & 0 & 0 & 0 & DF & 0 & 0 & 0 & 0 \\ MF & 0 & 0 & 0 & 0 & DF & 0 & 0 & 0 \\ MF & 0 & 0 & 0 & 0 & 0 & DF & 0 & 0 \\ MF & 0 & 0 & 0 & 0 & 0 & 0 & DF & 0 \\ MF & 0 & 0 & 0 & 0 & 0 & 0 & 0 & DF, \end{matrix} \quad (1)$$

where the N×M matrix (T) represents M cylinder pressure loading conditions, which when superimposed (i.e., added) produce the overall torque response of the crankshaft 27 due to normal firing. The entries of the matrix T represent pressures for the N cylinders used by the model to calculate the expected response vectors.

Figure 3A:
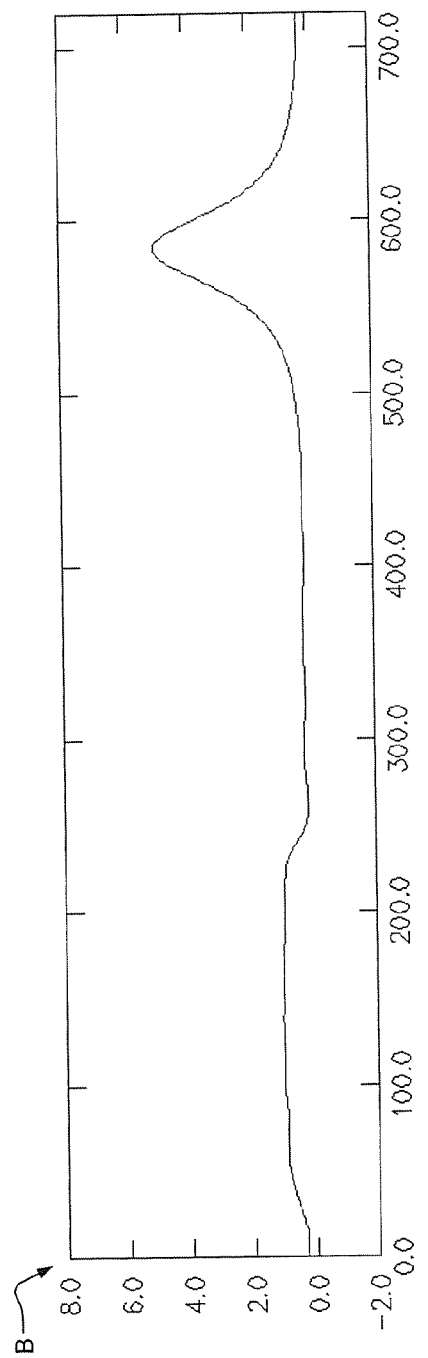
FIGS. 3A-3C are graphs illustrating simulated cylinder pressure during an engine cycle for misfiring, differential pressure firing, and normal firing, respectively, according to one implementation of the present disclosure.
Figure 3B:
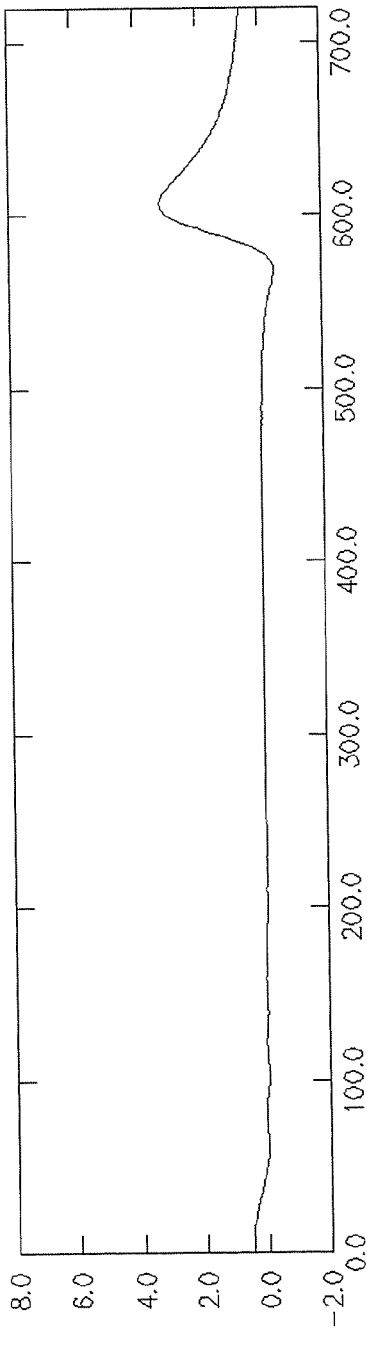
Figure 3C:
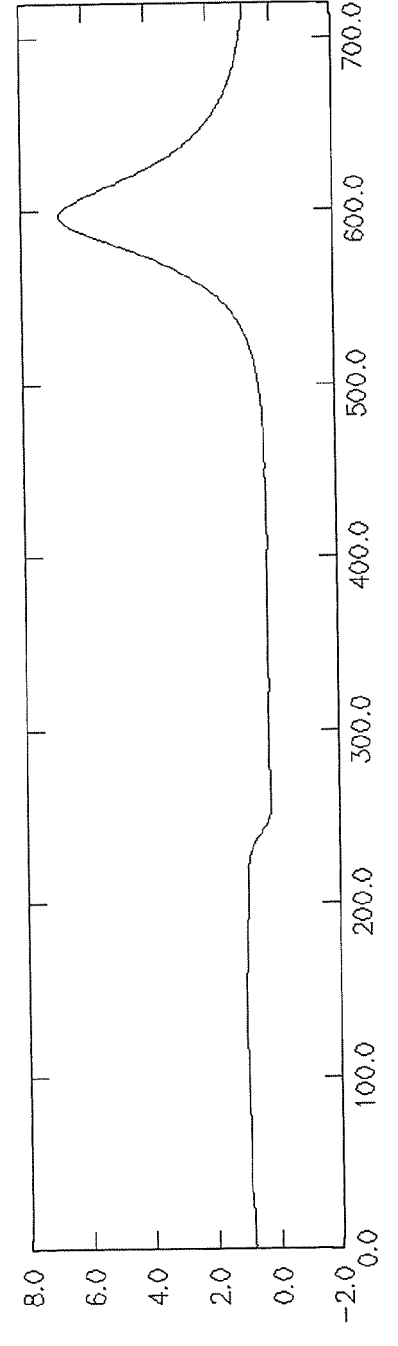

Specifically, MF represents a misfire pressure, DF represents a differential firing pressure, and 0 represents zero pressure. The differential firing pressure DF may also be defined as a difference between a normal firing pressure (NF) and the misfire pressure MF. The normal firing pressure NF may be an average of cylinder pressures over a number of engine cycles. For example, the NF may be an average pressure over 100 to 300 engine cycles. FIGS. 3A-3C illustrate simulated MF, DF, and NF, respectively, for cylinders during a full engine cycle (720°). A horizontal axis (A) represents crank angle degrees (CAD, in °) and a vertical axis (B) represents cylinder pressure (Bar).

Alternatively, for example, the test data based P×M matrix of expected responses may be generated based on test data. Because running the engine 12 at DF and MF on all cylinders may be difficult, the test data may be collected by running the engine 12 first at NF on all cylinders and then at MF for each of the N cylinders (with the remainder of the N cylinders at NF). The P×M matrix may then be generated based on a linear combination of the expected response vectors determined at these alternative loading conditions. For example, the expected response vectors corresponding to DF on a particular cylinder may be calculated by subtracting the expected response vector corresponding to MF on that cylinder (with the remainder of the N cylinders at NF) from the expected response vector corresponding to NF on all cylinders. Similarly, for example, the expected response vector corresponding to MF on all cylinders may be calculated by subtracting the product of (N-1) times the expected response vector corresponding to NF on all cylinders from the sum of the N expected response vectors corresponding to the MF on each cylinder (with the remainder of the N cylinders at NF). The inverse determination module 64 determines an inverse of the P×M matrix. The inverse P×M matrix ($\phi^{-1}$) may be calculated as follows:

$$\phi^{-1} = [\phi^T \times \phi]^{-1} \times \phi^T \quad (2).$$

In other words, the inverse matrix $\phi^{-1}$ may be defined as a product of an inverse and a transpose P×M matrix ($\phi^T$), the inverse including an inverse of a product of the transpose P×M matrix $\phi^T$ and the P×M matrix ($\phi$). The inverse matrix $\phi^{-1}$, therefore, may also be referred to as a pseudo-inverse.

The measured response module 68, on the other hand, determines the measured response vector (X) of the crankshaft speed due to combustion. The measured response module 68, therefore, may receive the signal from the engine speed sensor 28 indicating engine speed. Specifically, the measured response module 68 may generate a vector including the measured response of the crankshaft speed due to combustion within each of the N cylinders.

The coefficient calculation module 72 calculates coefficients for each of the M expected response vectors based on a product of the inverse matrix $\phi^{-1}$ and the measured response vector. For example, the coefficient calculation module 72 may calculate the coefficients as follows:

$$\eta = \phi^{-1} \times X \quad (3),$$

where $\eta$ represents a vector including the coefficients for the N differential pressure combustion response vectors and X represents the measured response vector. Note that the coefficient vector $\eta$ may also include a coefficient for the misfiring of all N cylinders but this coefficient is not used in the IMEP calculation.

Figure 4A:
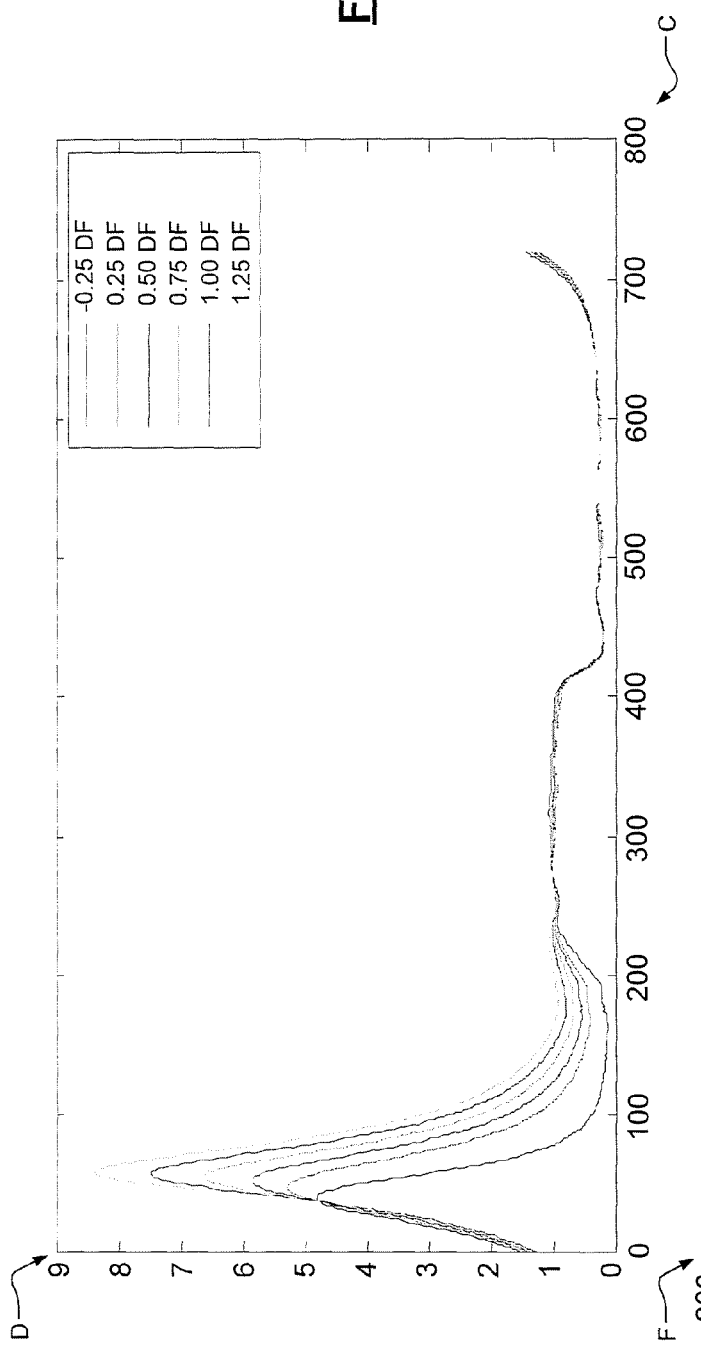
FIGS. 4A-4B are graphs illustrating simulated cylinder pressure during an engine cycle for various coefficients and a corresponding relationship between the coefficients and indicated mean effective pressure (IMEP), respectively, according to one implementation of the present disclosure.
Figure 4B:
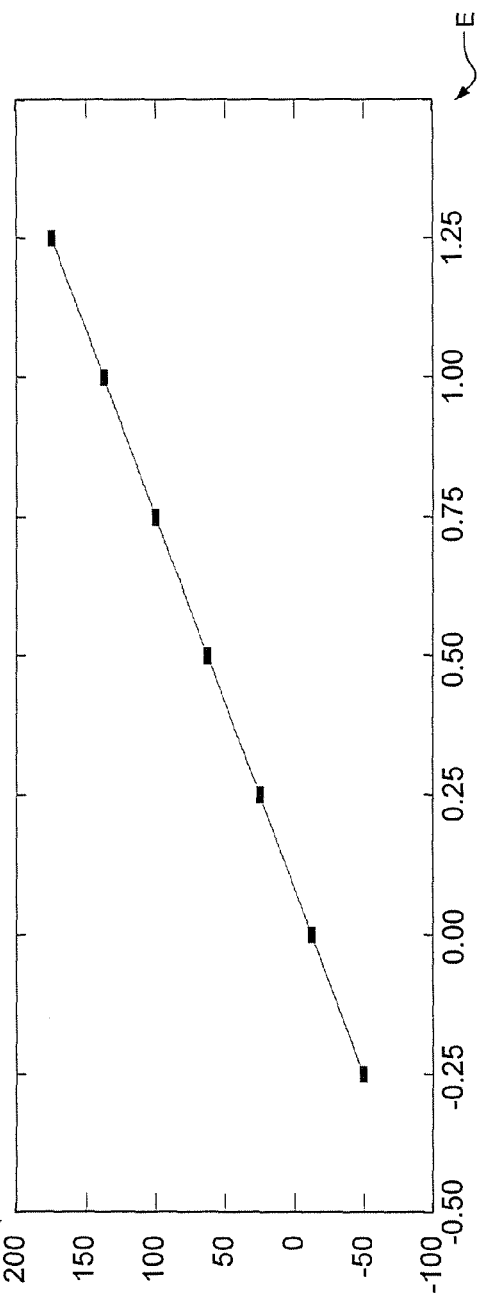

The IMEP estimation module 76 estimated IMEP for each of the N cylinders based on the coefficients. For example, the IMEP estimation module 76 may use a lookup table to estimate IMEP based on the coefficient. FIGS. 4A-4B illustrate a relationship between combustion pressure, coefficients, and IMEP. Specifically, FIG. 4A illustrates cylinder pressure for various coefficients during a full engine cycle. As shown, a larger coefficient may represent a larger cylinder pressure. A horizontal axis (C) represents CAD (°) and a vertical axis (D) represents cylinder pressure (Bar). FIG. 4B, on the other hand, illustrates the relationship between the coefficients and IMEP. A horizontal axis (E) represents the coefficients and a vertical axis (F) represents IMEP (kPa). This relationship allows for the IMEP to be estimated after determining the coefficients.

The misfire detection module 80 and the combustion control module 84 may both receive the estimated IMEPs for the N cylinders. The misfire detection module 80 may detect a misfire of a cylinder when the estimated IMEP for that cylinder is less than a predetermined threshold. When a misfire is detected, the misfire detection module 80 may generate a warning signal and/or set a misfire flag (represented by signal 82). The combustion control module 84, on the other hand, may control combustion based on the estimated IMEPs. Specifically, the combustion control module 84 may balance torque generated by each of the N cylinders. For example, the combustion control module 84 may selectively advance or retard spark timing for each of the N cylinders based on the estimated IMEPs to balance the torque generated across the N cylinders. The combustion control module 84, however, may also control combustion by controlling fuel injection and/or fuel injection timing and/or camshaft phase.

Figure 5:
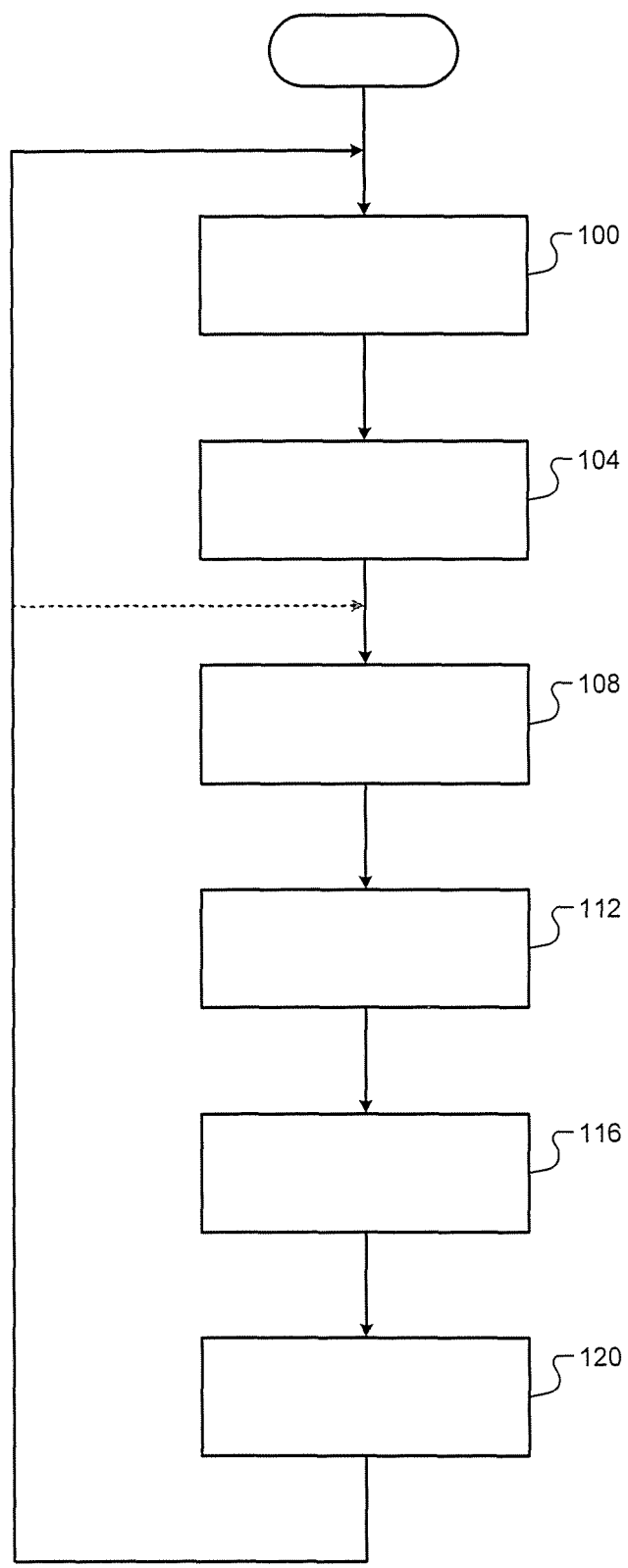
FIG. 5 is a flow diagram illustrating an example method for estimating IMEP for cylinders of an engine according to one implementation of the present disclosure.

Referring now to FIG. 5, an example method for estimating IMEP for cylinders in an engine begins at 100. At 100, the control module 50 determines the expected response vectors. At 104, the control module 50 determines the inverse matrix $\phi^{-1}$ based on the expected response vectors. At 108, the control module 50 determines the measured response vector. At 112, the control module 50 calculates the coefficients based on the inverse matrix $\phi^{-1}$ and the measured response vector. At 116, the control module 50 estimates IMEP for each of the N cylinders based on the coefficients. At 120, the control module 50 detects misfires and/or controls combustion based on the estimated IMEPs. Control may then return to 100. Alternatively, control may then return to 108 where the measured response vector is determined again (i.e., the expected response may not change and therefore 100 and 104 may not repeat).

Figure 6A:
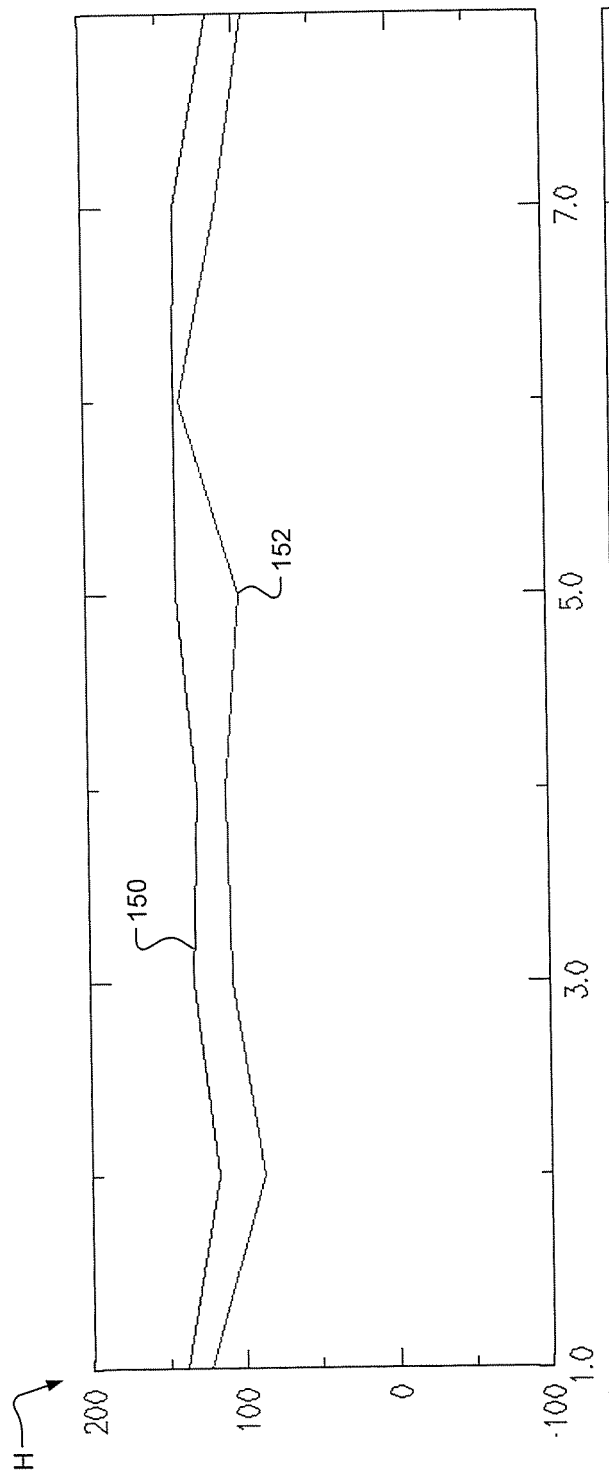
FIGS. 6A-6B are graphs illustrating measured IMEP versus estimated IMEP during an engine cycle according to one implementation of the present disclosure.
Figure 6B:
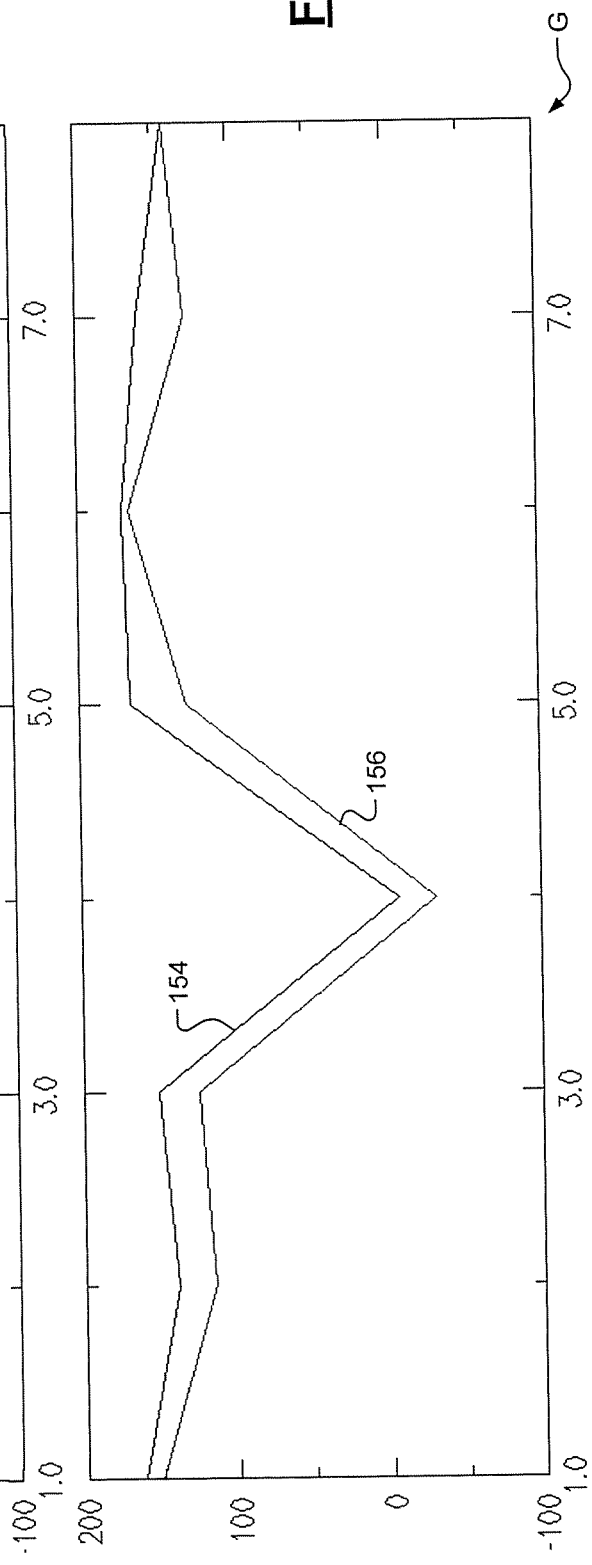

FIGS. 6A-6B illustrate measured IMEP vs. estimated IMEP according to the present disclosure. A horizontal axis (G) represents cylinder number (e.g., 1, 2, 3 . . . 8) and a vertical axis (H) represents IMEP (kPa). Specifically, FIG. 6A illustrates measured IMEP 150 vs. estimated IMEP 152 for normal firing. FIG. 6B, on the other hand, illustrates measured IMEP 154 vs. estimated IMEP 156 for a single-cylinder misfire (e.g., cylinder 4). As shown, both estimated IMEPs 152, 156 are approximately equal to the corresponding measured IMEPs 150, 154, and both accurately track misfires as well.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for an engine, the system comprising:
   a first module that determines an expected response of crankshaft speed due to combustion within a cylinder of the engine;
   a second module that determines a value based on the expected response and a measured response of crankshaft speed due to combustion within the cylinder of the engine;
   a third module that estimates an indicated mean effective pressure (IMEP) for the cylinder of the engine based on the value; and
   a fourth module that selectively adjusts an operating parameter of the engine based in the estimated IMEP.

2. The system of claim 1, wherein the first module determines M expected responses in crankshaft speed due to combustion within each of N cylinders of the engine, wherein N is an integer greater than one, and wherein M is an integer greater than N.

3. The system of claim 2, wherein the M expected responses in crankshaft speed are vectors that include N expected responses due to differential pressure firing within each of N cylinders of the engine, respectively, and a misfiring of all N cylinders of the engine.

4. The system of claim 3, wherein the first module generates a P×M matrix that includes the M expected response vectors, wherein P is a number of sampling points of crankshaft speed for one engine cycle, and wherein P is an integer greater than or equal to M.

5. The system of claim 4, further comprising a fifth module that generates the measure response in crankshaft speed, wherein the measured response is a vector including measured responses in crankshaft speed due to combustion within each of the N cylinders.

6. The system of claim 5, further comprising a sixth module that calculates an inverse of the P×M matrix based on a product of an inverse and a transpose of the P×M, wherein the inverse includes an inverse of a product of the transpose of the P×M matrix and the P×M matrix.

7. The system of claim 6, wherein the second module determines a value for each of the N cylinders based on a product of the inverse P×M matrix and the measured response vector.

8. The system of claim 7, wherein the third module estimates an IMEP for each of the N cylinders based on the N determined values, respectively, using a lookup table.

9. The system of claim 8, wherein the fourth module detects a misfire of a cylinder when the estimated IMEP for the cylinder is less than a predetermined threshold, and wherein when a misfire is detected the fourth module one of (i) generates a warning signal and (ii) sets a misfire flag.

10. The system of claim 8, wherein the fourth module balances torque generated by the engine by controlling spark advance for each cylinder based on the estimated IMEP.

11. A method for an engine, the method comprising:
    determining an expected response of crankshaft speed due to combustion within a cylinder of the engine;
    determining a value based on the expected response and a measured response of crankshaft speed due to combustion within the cylinder of the engine;
    estimating an indicated mean effective pressure (IMEP) for the cylinder of the engine based on the value; and
    selectively adjusting an operating parameter of the engine based in the estimated IMEP.

12. The method of claim 11, further comprising determining M expected responses in crankshaft speed due to combustion within each of N cylinders of the engine, wherein N is an integer greater than one, and wherein M is an integer greater than N.

13. The method of claim 12, wherein the M expected responses in crankshaft speed are vectors that include N expected responses due to differential pressure firing within each of N cylinders of the engine, respectively, and a misfiring of all N cylinders of the engine.

14. The method of claim 13, further comprising generating a P×M matrix that includes the M expected response vectors, wherein P is a number of sampling points of crankshaft speed for one engine cycle, and wherein P is an integer greater than or equal to M.

15. The method of claim 14, further comprising generating the measure response in crankshaft speed, wherein the measured response is a vector including measured responses in crankshaft speed due to combustion within each of the N cylinders.

16. The method of claim 15, further comprising calculating an inverse of the P×M matrix based on a product of an inverse and a transpose of the P×M, wherein the inverse includes an inverse of a product of the transpose of the P×M matrix and the P×M matrix.

17. The method of claim 16, further comprising determining a value for each of the N cylinders based on a product of the inverse P×M matrix and the measured response vector.

18. The method of claim 17, further comprising estimating an IMEP for each of the N cylinders based on the N determined values, respectively, using a lookup table.

19. The method of claim 18, further comprising detecting a misfire of a cylinder when the estimated IMEP for the cylinder is less than a predetermined threshold, and wherein when a misfire is detected one of (i) generating a warning signal and (ii) setting a misfire flag.

20. The method of claim 18, further comprising balancing torque generated by the engine by controlling spark advance for each cylinder based on the estimated IMEP.

* * * * *